US012573720B2

(12) United States Patent
Hu et al.

(10) Patent No.: US 12,573,720 B2
(45) Date of Patent: Mar. 10, 2026

(54) BATTERY CORE ASSEMBLY, BATTERY, BATTERY PACK AND VEHICLE

(71) Applicant: BYD COMPANY LIMITED, Guangdong (CN)

(72) Inventors: Shichao Hu, Shenzhen (CN); Han Cheng, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 604 days.

(21) Appl. No.: 17/988,537

(22) Filed: Nov. 16, 2022

(65) Prior Publication Data

US 2023/0076040 A1      Mar. 9, 2023

Related U.S. Application Data

(63) Continuation of application No. PCT/CN2021/093196, filed on May 12, 2021.

(30) Foreign Application Priority Data

May 18, 2020    (CN) .......................... 202020835882.4

(51) Int. Cl.
*H01M 50/477* (2021.01)
*H01M 50/105* (2021.01)
(Continued)

(52) U.S. Cl.
CPC ....... *H01M 50/477* (2021.01); *H01M 50/105* (2021.01); *H01M 50/178* (2021.01);
(Continued)

(58) Field of Classification Search
CPC ............. H01M 50/477; H01M 50/105; H01M 50/178; H01M 50/211; H01M 50/474;
(Continued)

(56) References Cited

U.S. PATENT DOCUMENTS

2009/0263712 A1* 10/2009 Mizuta ................ H01M 50/557
429/177
2016/0164133 A1* 6/2016 Matsumoto ......... H01M 50/566
29/623.2

FOREIGN PATENT DOCUMENTS

CN        201936935 U      8/2011
CN        204130602 U      1/2015
(Continued)

OTHER PUBLICATIONS

International Search Report and Written Opinion for Application No. PCT/CN2021/093196, mailed on Aug. 12, 2021, 10 pages.

*Primary Examiner* — Daniel S Gatewood
(74) *Attorney, Agent, or Firm* — Sheppard Mullin Richter & Hampton LLP

(57) ABSTRACT

An electrode core assembly includes an encapsulation film, and an electrode core and a spacer that are disposed in an accommodating cavity defined by the encapsulation film. The electrode core includes an electrode core body and two electrode lead-out members that are electrically connected to the electrode core body. The length of the electrode core body extends along a first direction. Each of two opposite ends of the electrode core body in the first direction includes a V-shaped end in a cross-sectional view with a tip protruding outward from the electrode core body. The two electrode lead-out members are connected to the electrode core body at the tips of the two V-shaped ends. The spacer includes an inclined portion disposed on one of the V-shaped ends and has an electrode lead-out hole penetrating through the spacer and being configured to allow the electrode lead-out member to pass through.

14 Claims, 4 Drawing Sheets

(51) Int. Cl.

| | |
|---|---|
| *H01M 50/178* | (2021.01) |
| *H01M 50/211* | (2021.01) |
| *H01M 50/474* | (2021.01) |
| *H01M 50/531* | (2021.01) |
| *H01M 50/548* | (2021.01) |

(52) U.S. Cl.
CPC ....... *H01M 50/211* (2021.01); *H01M 50/474* (2021.01); *H01M 50/531* (2021.01); *H01M 50/548* (2021.01); *H01M 2220/20* (2013.01)

(58) Field of Classification Search
CPC ............. H01M 50/531; H01M 50/548; H01M 2220/20; H01M 10/058; H01M 10/42; H01M 50/50; H01M 50/586; H01M 50/553; H01M 10/04; H01M 50/103; H01M 50/593; H01M 50/176; H01M 50/209; H01M 50/249; Y02E 60/10
See application file for complete search history.

(56) References Cited

FOREIGN PATENT DOCUMENTS

| | | | |
|---|---|---|---|
| CN | 105702999 | A | 6/2016 |
| CN | 110518174 | A | 11/2019 |
| CN | 110729421 | A | 1/2020 |
| CN | 212587691 | U | 2/2021 |
| JP | 4692772 | B2 | 6/2011 |
| JP | 2012527063 | A | 11/2012 |
| JP | 2013041851 | A | 2/2013 |

* cited by examiner

200

300

BATTERY CORE ASSEMBLY, BATTERY, BATTERY PACK AND VEHICLE

CROSS-REFERENCE TO RELATED APPLICATIONS

The application is a continuation application of International Patent Application No. PCT/CN2021/093196 filed with the China National Intellectual Property Administration (CNIPA) on May 12, 2021, which is based on and claims priority to and benefits of Chinese Patent Application No. 202020835882.4 filed on May 18, 2020. The entire content of all of the above-referenced applications is incorporated herein by reference.

FIELD

The present disclosure relates to the field of batteries, and specifically to a battery core assembly, a battery module, a battery pack, and a vehicle.

BACKGROUND

For power batteries for new energy vehicles, safety, battery life, and service life are all important and are essential factors. However, the tab of the battery core of the existing power battery is formed by die cutting, and when end portions of the battery core is squeezed, the internal positive and negative electrode sheets are squeezed to cause the contact between the positive and negative electrode sheets, so there is a risk of short circuit.

SUMMARY

The present disclosure provides an electrode core assembly, which includes an encapsulation film, an electrode core and a spacer. The electrode core and the spacer are disposed in an accommodating cavity defined by the encapsulation film, the electrode core includes an electrode core body and two electrode lead-out members that are electrically connected to the electrode core body, the length of the electrode core body extends along a first direction, each of two opposite ends of the electrode core body in the first direction includes a V-shaped end in a cross-sectional view with a tip protruding outward from the electrode core body, and the two electrode lead-out members are connected to the electrode core body at the tips of the two V-shaped ends. The spacer includes an inclined portion disposed on one of the V-shaped ends, and the inclined portion has an electrode lead-out hole penetrating through the spacer and being configured to allow the electrode lead-out member to pass through.

Compared with related art, the present disclosure has the following beneficial effects.

During the fabrication of the electrode core assembly, when the space inside the encapsulation film is vacuumed, the air pressure outside the encapsulation film will squeeze the end of the electrode core to a certain extent due to the pressure difference between the inside and outside of the encapsulation film, potentially causing contact between the positive and negative sheets in the electrode core and thus short-circuit. By arranging an spacer on the end of the electrode core in such a manner that the inclined portion of the spacer is arranged on the V-shaped end of the electrode core, the spacer can buffer the pressure applied to the end of the electrode core. This can prevent the V-shaped end of the electrode core from being squeezed to some extent, and thus reduce or eliminate the risk of short circuit caused by the contact between the positive and negative sheets in the electrode core.

In some embodiments of the present disclosure, the inclined portion includes a first inclined portion and a second inclined portion that are connected to form a V-shaped inclined portion. The electrode lead-out hole is formed between the first inclined portion and the second inclined portion.

In some embodiments of the present disclosure, each of the two opposite ends of the electrode core body in the first direction further includes a flat surface extended from each of both ends of the V-shaped end, and the V-shaped end and the flat surface form a step structure.

In some embodiments of the present disclosure, the spacer further includes a flat portion, and the flat portion is disposed on one of the flat surfaces.

In some embodiments of the present disclosure, the first inclined portion and the second inclined portion are connected by the flat portion.

In some embodiments of the present disclosure, a first partial area of the first inclined portion is attached to the V-shaped end, and a second partial area of the first inclined portion has a gap with the V-shaped end; and/or a first partial area of the second inclined portion is attached to the V-shaped end, and a second partial area of the second inclined portion has a gap with the V-shaped end.

In some embodiments of the present disclosure, the electrode core further includes a tab extending from the tip of the V-shaped end, and the electrode lead-out member is electrically connected to the tab.

In a second aspect, the present disclosure provides a battery, which includes a casing and an electrode core assembly as described above disposed in the casing.

In a third aspect, the present disclosure provides a battery pack, which includes multiple batteries as described above.

In a fourth aspect, the present disclosure provides a vehicle, which includes a battery pack as described above.

DETAILED DESCRIPTION

Figure 1:
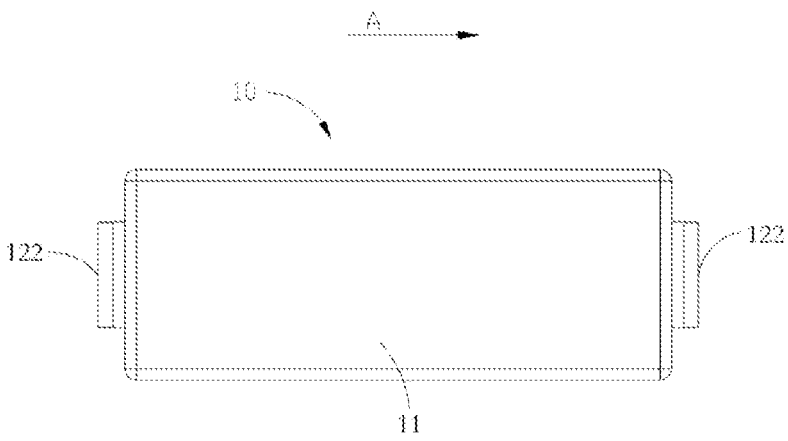
FIG. 1 is a schematic structural view of an electrode core assembly provided in an embodiment of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary to explain the present disclosure and do not construe as a limitation on the present disclosure.

In the description of the present disclosure, it should be understood that, terms such as "length", "width", "up", "down", "front", "rear", "left", "right", "vertical", "horizontal", "top", "bottom", "inside", and "outside" indicate an orientation or position relationship based on the orientation or position shown in the accompanying drawings. These terms are merely for the convenience of describing the present disclosure and simplifying the description, and not to indicate or imply that the device or element referred to needs to have a particular orientation, be constructed and operated in a particular orientation, and therefore cannot be understood as a limitation on the present disclosure.

In addition, the terms "first" and "second" are used merely for the purpose of description, and shall not be construed as indicating or implying relative importance or implying a number of indicated technical features. Therefore, features defining "first" and "second" may explicitly or implicitly include one or more such features. In the description of the present disclosure, "number of", "multiple", or "plurality of" means two or more, unless otherwise specifically defined.

In the present disclosure, terms such as "installation", "connected", "connection", and "fastening" shall be understood in a broad sense unless otherwise expressly specified and defined, which for example, may be fixedly connected, detachably connected, or integrally formed; may be mechanically or electrically connected; may be directly connected or indirectly connected by an intermediate medium; or may be connection between two elements or interaction between two elements. For a person of ordinary skill in the art, specific meanings of the terms in the present disclosure may be understood based on a specific situation.

The present disclosure provides an electrode core assembly, which includes an encapsulation film, an electrode core, and an spacer. The electrode core is arranged/disposed in an accommodating cavity defined by the encapsulation film. The electrode core includes an electrode core body and two electrode lead-out members of opposite polarities that are electrically connected to the electrode core body. The length of the electrode core body extends along a first direction. Each of the two opposite ends of the electrode core body in the first direction include a V-shaped end in a cross-sectional view with a tip protruding outward from the electrode core body, and the two electrode lead-out members are connected to the electrode core body respectively at the tips of the two V-shaped ends. The spacer includes an inclined portion arranged on the V-shaped end, and the inclined portion is provided with an electrode lead-out hole penetrating through the spacer and configured to let the electrode lead-out member to pass through.

Compared with related art, the present disclosure has the following beneficial effects.

During the fabrication of the electrode core assembly, when the space inside the encapsulation film is vacuumed, the air pressure outside the encapsulation film will squeeze the end of the electrode core to a certain extent due to the pressure difference between the inside and outside of the encapsulation film, potentially causing contact between the positive and negative sheets in the electrode core and thus short-circuit. By arranging a spacer on the end of the electrode core in such a manner that the inclined portion of the spacer is arranged on the V-shaped end of electrode core, the spacer can buffer the pressure applied to the end of the electrode core. This prevents the V-shaped end of the electrode core from being squeezed to some extent, and thus reduces or eliminates the risk of short circuit caused by the contact between the positive and negative sheets in the electrode core.

Figure 2:
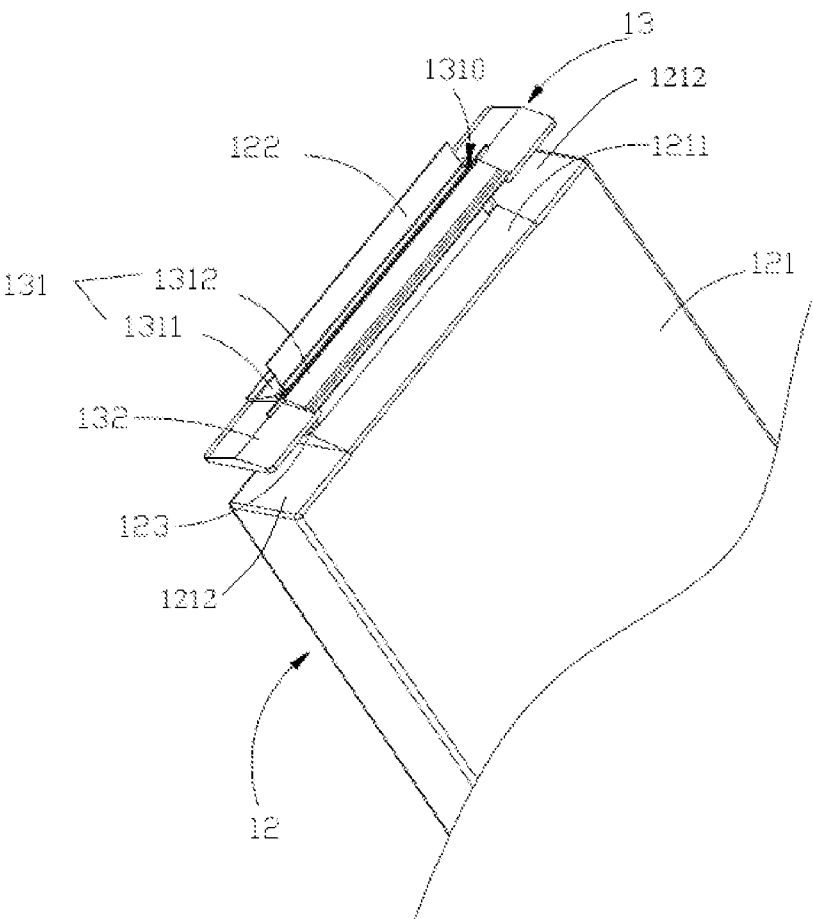
FIG. 2 is a schematic structural view of an electrode core assembly provided in an embodiment of the present disclosure, from which an encapsulation film is removed.
Figure 3:
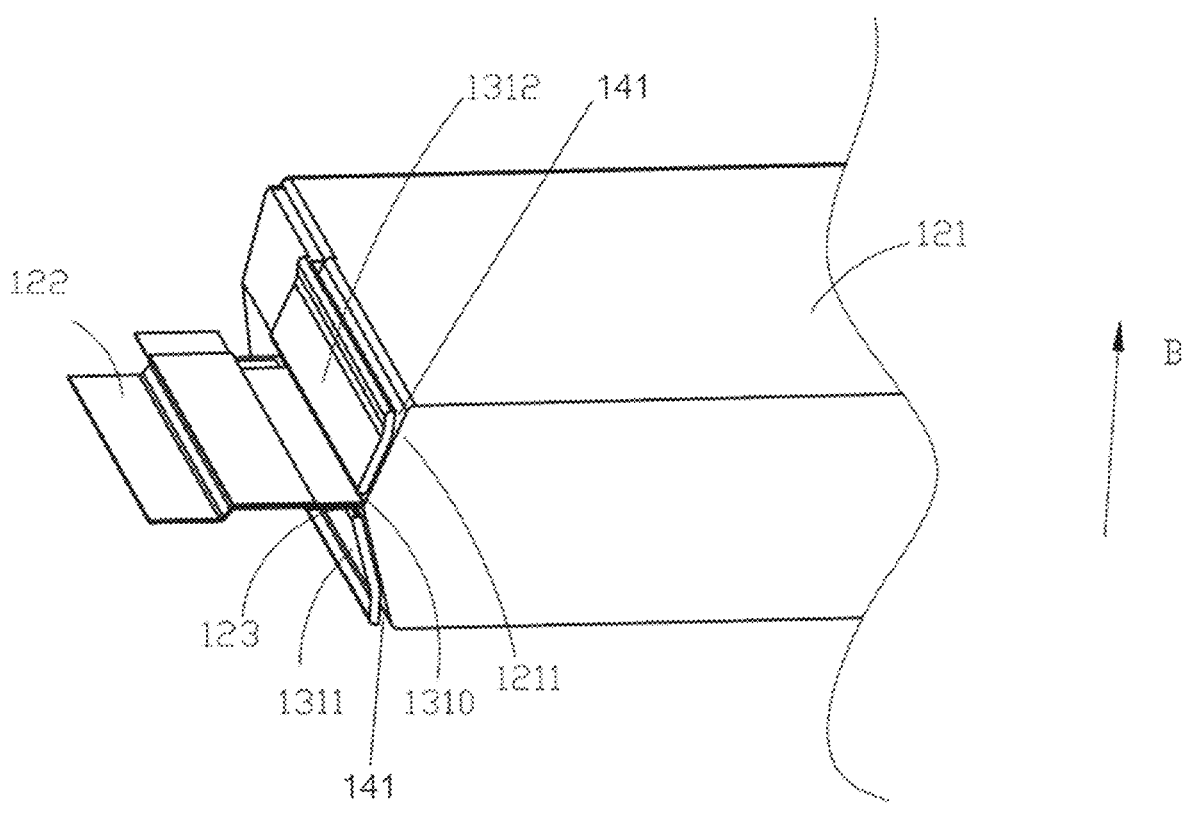
FIG. 3 is a schematic view of the electrode core assembly shown in FIG. 1 provided in an embodiment of the present disclosure, from which the encapsulation film is removed.

FIG. 1 is a schematic structural view of an electrode core assembly provided in an embodiment of the present disclosure. FIG. 2 is a schematic structural view of an electrode core assembly provided in an embodiment of the present disclosure, from which an encapsulation film is removed. FIG. 3 is a schematic view of the electrode core assembly shown in FIG. 1 provided in an embodiment of the present disclosure, from which the encapsulation film is removed. Referring to FIGS. 1, 2, and 3, an electrode core assembly 10 includes an encapsulation film 11, an electrode core 12, and a spacer 13. The electrode core 12 and the spacer 13 are both arranged in an accommodating cavity defined by the encapsulation film 11. The electrode core 12 includes an electrode core body 121 and two electrode lead-out members 122 of opposite polarities electrically connected to the electrode core body 121. One of the two electrode lead-out members 122 is a positive electrode lead-out member, and the other one is a negative electrode lead-out member. The length of the electrode core body 121 extends along a first direction A. Two opposite ends of the electrode core body 121 in the first direction A include a V-shaped end 1211 in a cross-sectional view with a tip protruding outward from the electrode core body, and the two electrode lead-out members 122 are connected to the electrode core body 121 respectively at the tips of the two V-shaped ends 1211. The spacer 13 includes an inclined portion 131 arranged on the V-shaped end 1211, and the inclined portion 131 is provided with an electrode lead-out hole 1310 penetrating through the spacer 13 and configured to let the electrode lead-out member to pass through.

In the present disclosure, during the fabrication of the electrode core assembly 10, when the space inside the encapsulation film 11 is vacuumed, the air pressure outside the encapsulation film 11 may squeeze the end of the electrode core 12 to a certain extent due to the pressure difference between the inside and outside of the encapsulation film 11, potentially causing the contact between the positive and negative sheets in the electrode core 12 and thus short-circuit. By arranging a spacer 13 on the end of the electrode core in such a manner that the inclined portion 131 of the spacer 13 is arranged on the V-shaped end 1211 of electrode core 12, the spacer 13 can buffer the pressure applied to the end of the electrode core 12. This prevents the V-shaped end 1211 of the electrode core 12 from being squeezed to some extent, and thus reduces or eliminates the risk of short circuit caused by the contact between the positive and negative sheets in the electrode core 12.

In some embodiments of the present disclosure, the inclined portion 131 includes a first inclined portion 1311 and a second inclined portion 1312, where the first inclined portion 1311 and the second inclined portion 1312 are connected to form a V-shaped inclined portion 131. The electrode lead-out hole 1310 is a through hole formed between the first inclined portion 1311 and the second inclined portion 1312.

The thickness of the electrode core body 121 extends along a second direction B, where the second direction B is perpendicular to the first direction A. The first inclined portion 1311 and the second inclined portion 1312 are arranged along the second direction B. Moreover, the electrode lead-out hole 1310 is located between the first inclined portion 1311 and the second inclined portion 1312. The electrode lead-out member 122 extends out of the electrode lead-out hole 1310 and out of the encapsulation film 11, to electrically connect to an electrode lead-out member of an opposite polarity of another electrode core assembly 10.

Therefore, the shape of the spacer 13 highly mates or matches with the V-shaped end 1211 of the electrode core body 121 of the electrode core 12, so that the spacer 13 can well buffer the pressure applied to the V-shaped end 1211 of the electrode core when the encapsulation film 11 is vacuumed, and other pressures from the first direction A. This prevents the V-shaped end 1211 of the electrode core 12 from being squeezed to some extent, and thus reduces or eliminates the risk of short circuit caused by the contact between the positive and negative sheets in the electrode core 12.

In some embodiments of the present disclosure, a partial area of the first inclined portion 1311 and/or a partial area of the second inclined portion 1312 is/are attached to the V-shaped end 1211, and another partial area of the first inclined portion 1311 and/or another partial area of the second inclined portion 1312 has/have a gap 141 with the V-shaped end 1211.

In some embodiments of the present disclosure, a partial area of the first inclined portion 1311 close to the tip of the V-shaped end 1211 is attached to the V-shaped end 1211, and another partial area of the first inclined portion 1311 away from the tip of the V-shaped end 1211 has a gap 141 with the V-shaped end 1211. Similarly, a partial area of the second inclined portion 1312 close to the tip of the V-shaped end 1211 is attached to the V-shaped end 1211, and another partial area of the second inclined portion 1312 away from the tip of the V-shaped end 1211 has a gap 141 with the V-shaped end 1211. As a result, the first inclined portion 1311 tilts with respect to the corresponding V-shaped end 1211, and the second inclined portion 1312 tilts with respect to the corresponding V-shaped end 1211, whereby the first inclined portion 1311 and the second inclined portion 1312 can well buffer the pressure applied to the V-shaped end 1211 of the electrode core when the encapsulation film 11 is vacuumed, and other pressures from the first direction A, resulting in a better buffering effect.

In some other embodiments of the present disclosure, the first inclined portion 1311 may be fully attached to the corresponding V-shaped end 1211, and the second inclined portion 1312 may also be fully attached to the corresponding V-shaped end 1211. It can be understood that such an arrangement can also buffer the pressure exerted on the V-shaped end 1211 of the electrode core when the encapsulation film 11 is vacuumed, and other pressures from the first direction A, resulting in a better buffering effect.

In some embodiments of the present disclosure, the two opposite ends of the electrode core body 121 in the first direction A further includes a flat surface 1212 on both sides of the V-shaped end 1211, where the V-shaped end 1211 and the flat surface 1212 form a step structure. The tab is arranged or disposed on the V-shaped end 1211, but not on the flat surface 1212.

In some embodiments of the present disclosure, the spacer 13 further includes a flat portion 132, where the flat portion 132 is arranged on the flat surface 1212. The flat portion 132 fixes the electrode core 12, to prevent the electrode core 12 from moving inside the casing to further squeeze the V-shaped end 1211 when it is pressed, thus greatly reducing the risk of short circuit caused by the contact between the positive and negative sheets in the electrode core 12.

In some embodiments of the present disclosure, the first inclined portion 1311 and the second inclined portion 1312 are connected by the flat portion 132, thus further enhancing the compressive strength of the spacer 13.

Figure 4:
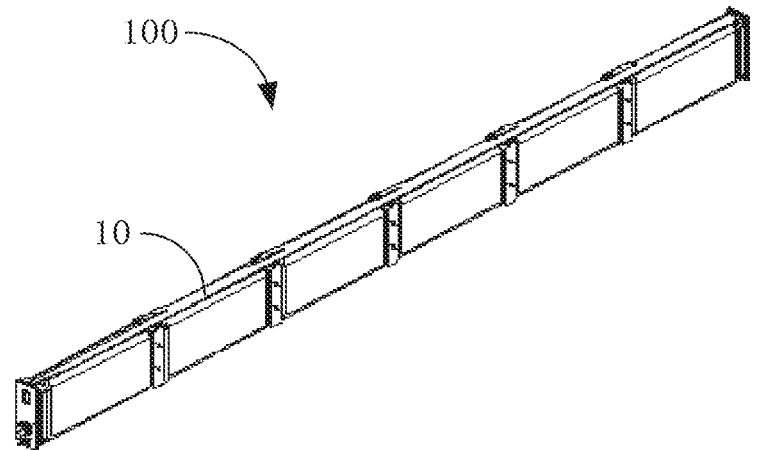
FIG. 4 is a schematic structural view of a battery without a casing provided in an embodiment of the present disclosure.
Figure 5:
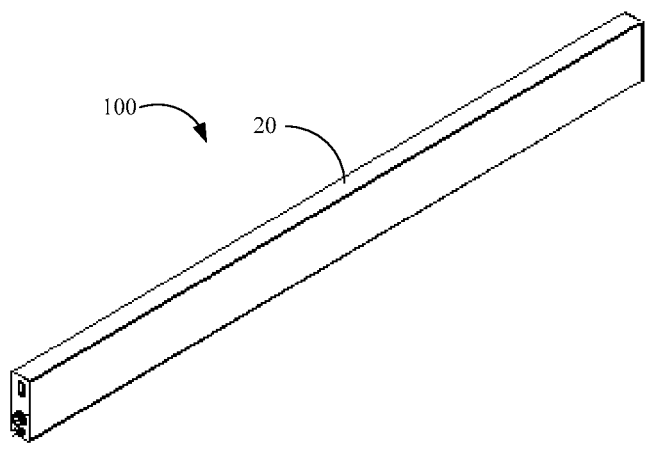
FIG. 5 is a schematic structural view of a battery with a casing provided in an embodiment of the present disclosure.

In some embodiments of the present disclosure, the electrode core 12 further includes two tabs 123 extending from the tip of the V-shaped end 1211, the two tabs 123 include a positive tab and a negative tab, and the two electrode lead-out members 122 are electrically connected to the two tabs 123 respectively. Referring to FIGS. 4 and 5, in an embodiment of the battery provided in the present disclosure, the battery 100 includes a casing 20 and at least one battery core assembly 10 packaged or disposed in the casing 20. As shown in FIG. 4, multiple battery core assemblies 10 are encapsulated or disposed in the casing 20, and the multiple battery core assemblies 10 are arranged in sequence along the first direction A of the battery 100. When the multiple battery core assemblies 10 are connected in series, the positive electrode lead-out member of one battery core assembly 10 is electrically connected to the negative electrode lead-out member of the other battery core assembly 10 of two battery core assemblies 10, to connect the two battery core assemblies 10 in series. The battery core assembly is a battery core assembly as described in any of the foregoing embodiments.

In some embodiments of the present disclosure, the casing 20 is a metal housing formed of metals, for example, an aluminum casing. Therefore, the casing 20 has sufficient strength, to prevent the damage or deformation due to collisions, and to improve the safety of the battery 100.

In some embodiments of the present disclosure, the battery 100 is a cuboid, and has a length L, a thickness W, and a height H, where the length L is greater than the height H, and the height H is greater than the thickness W. The length of the battery 100 may be 400-2500 mm, and the length to height ratio of the battery 100 may be 4-21.

It should be noted that the battery 100 being a cuboid means that the battery 100 has a cuboid shape, a cube shape, a roughly cuboid shape or cube shape that is locally irregular, and a generally approximate cuboid shape or cube shape that locally has a notch, a bump, a chamfer, an arc portion, or a curved portion.

The present disclosure further provides a battery module, which includes multiple batteries 100 provided in the present disclosure.

The present disclosure further provides a battery pack, which includes multiple batteries 100 provided in the present disclosure or multiple battery modules provided in the present disclosure.

Figure 6:
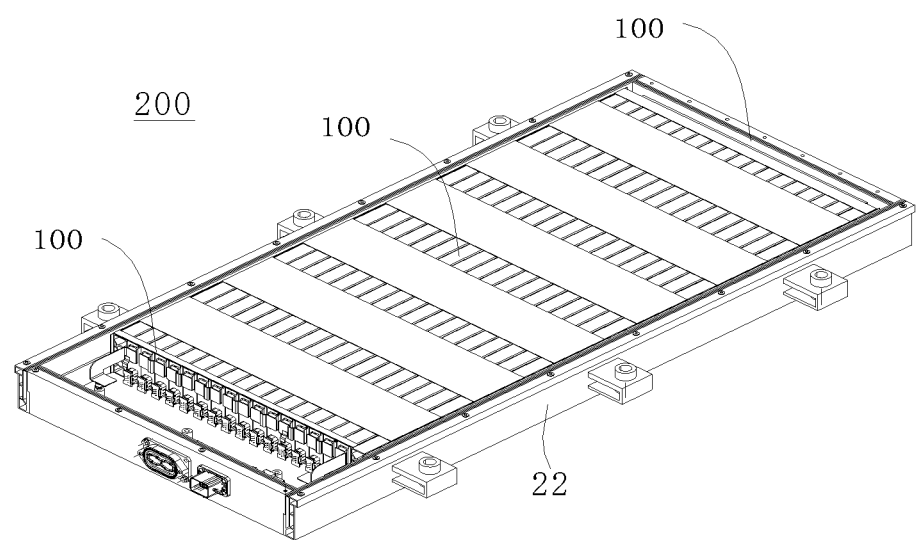
FIG. 6 is a schematic structural view of a battery pack provided in an embodiment of the present disclosure.
Figure 7:
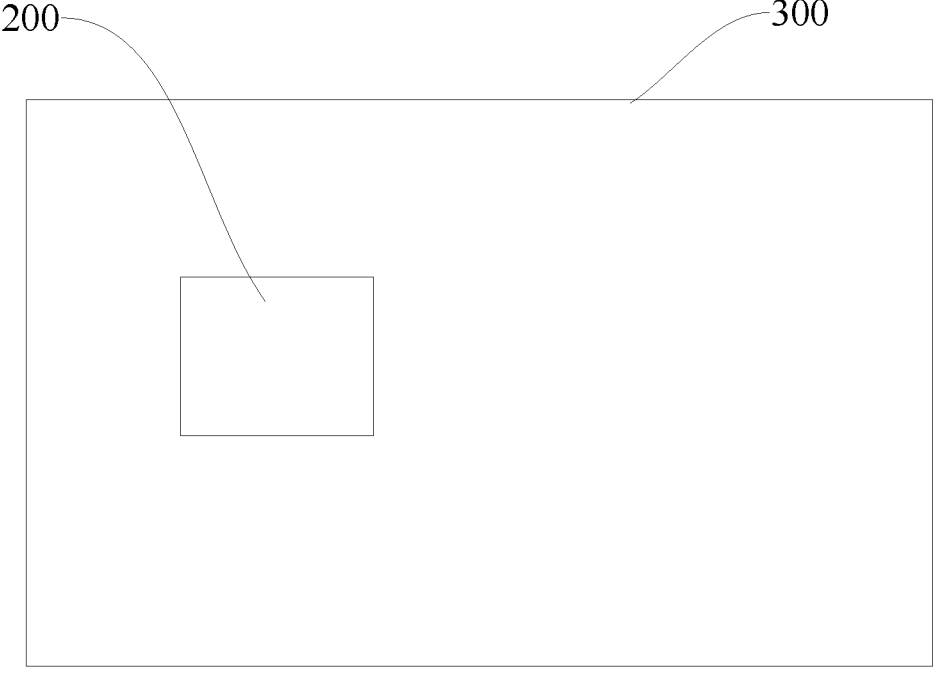
FIG. 7 is a schematic view of a vehicle provided in an embodiment of the present disclosure.

Referring to FIG. 6, the present disclosure provides a battery pack 200, which includes a tray 22 and the batteries 100 arranged on the tray 22.

The present disclosure further provides a vehicle 300, which includes a battery module or a battery pack provided in the present disclosure.

It can be seen from the above, that the embodiments of the present disclosure have excellent characteristics mentioned above, and are practical for use due to the performances that are not found in the related art, such that the product of the present disclosure has a great practical value.

The foregoing descriptions are merely examples of embodiments of the present disclosure, but do not limit the present disclosure. Any modification, equivalent replacement, and improvement made without departing from the idea and principle of the present disclosure shall fall within the protection scope of the present disclosure.

What is claimed is:

1. An electrode core assembly, comprising an encapsulation film, an electrode core, and a spacer, wherein the electrode core and the spacer are disposed in an accommodating cavity defined by the encapsulation film, the electrode core comprises an electrode core body and two electrode lead-out members that are electrically connected to the electrode core body, a length of the electrode core body extends along a first direction, each of two opposite ends of the electrode core body in the first direction comprises a V-shaped end in a cross-sectional view with a tip protruding outward from the electrode core body, and each of the two electrode lead-out members is connected to the electrode core body at the tip of the V-shaped end;

the spacer comprises an inclined portion disposed on the V-shaped end, the inclined portion comprises a first inclined portion and a second inclined portion that are connected to form a V-shaped inclined portion, and the inclined portion has an electrode lead-out hole formed between the first inclined portion and the second inclined portion penetrating through the spacer and being configured to allow one of the two electrode lead-out members to pass through; and a first partial area of the first inclined portion is attached to the V-shaped end, and a second partial area of the first inclined portion has a gap with the V-shaped end; and/or a first partial area of the second inclined portion is attached to the V-shaped end, and a second partial area of the second inclined portion has a gap with the V-shaped end.

2. The electrode core assembly according to claim 1, wherein each of the two opposite ends of the electrode core body in the first direction further comprises a flat surface extended from each of both ends of the V-shaped end, and the V-shaped end and the flat surface form a step structure.

3. The electrode core assembly according to claim 2, wherein the spacer further comprises a flat portion, and the flat portion is disposed on one of the flat surfaces.

4. The electrode core assembly according to claim 3, wherein the first inclined portion and the second inclined portion are connected by the flat portion.

5. The electrode core assembly according to claim 1, wherein the electrode core further comprises a tab extending from the tip of the V-shaped end, and the one of the two electrode lead-out members is electrically connected to the tab.

6. A battery, comprising a casing, and at least one battery core assembly disposed in the casing, wherein the at least one battery core assembly comprises the electrode core assembly according to claim 1.

7. A battery pack, comprising a plurality of batteries, wherein each of the plurality of batteries comprises a casing and at least one battery core assembly disposed in the casing, wherein the at least one battery core assembly comprises an electrode core assembly comprising an encapsulation film, an electrode core, and a spacer, wherein the electrode core and the spacer are disposed in an accommodating cavity defined by the encapsulation film, the electrode core comprises an electrode core body and two electrode lead-out members that are electrically connected to the electrode core body, a length of the electrode core body extends along a first direction, each of two opposite ends of the electrode core body in the first direction comprises a V-shaped end in a cross-sectional view with a tip protruding outward from the electrode core body, and each of the two electrode lead-out members is connected to the electrode core body at the tip of the V-shaped end;

the spacer comprises an inclined portion disposed on the V-shaped end, the inclined portion comprises a first inclined portion and a second inclined portion that are connected to form a V-shaped inclined portion, and the inclined portion has an electrode lead-out hole formed between the first inclined portion and the second inclined portion penetrating through the spacer and being configured to allow one of the two electrode lead-out members to pass through; and a first partial area of the first inclined portion is attached to the V-shaped end, and a second partial area of the first inclined portion has a gap with the V-shaped end; and/or a first partial area of the second inclined portion is attached to the V-shaped end, and a second partial area of the second inclined portion has a gap with the V-shaped end.

8. The battery pack according to claim 7, wherein each of the two opposite ends of the electrode core body in the first direction further comprises a flat surface extended from each of both ends of the V-shaped end, and the V-shaped end and the flat surface form a step structure.

9. The battery pack according to claim 8, wherein the spacer further comprises a flat portion, and the flat portion is disposed on one of the flat surfaces.

10. The battery pack according to claim 9, wherein the first inclined portion and the second inclined portion are connected by the flat portion.

11. A vehicle, comprising a battery pack comprising a plurality of batteries, wherein each of the plurality of batteries comprises a casing and at least one battery core assembly disposed in the casing, wherein the at least one battery core assembly comprises an electrode core assembly comprising an encapsulation film, an electrode core, and a spacer, wherein the electrode core and the spacer are disposed in an accommodating cavity defined by the encapsulation film, the electrode core comprises an electrode core body and two electrode lead-out members that are electrically connected to the electrode core body, a length of the electrode core body extends along a first direction, each of two opposite ends of the electrode core body in the first direction comprises a V-shaped end in a cross-sectional view with a tip protruding outward from the electrode core body, and each of the two electrode lead-out members is connected to the electrode core body at the tip of the V-shaped end;

the spacer comprises an inclined portion disposed on the V-shaped end, the inclined portion comprises a first inclined portion and a second inclined portion that are connected to form a V-shaped inclined portion, and the inclined portion has an electrode lead-out hole formed between the first inclined portion and the second inclined portion penetrating through the spacer and being configured to allow one of the two electrode lead-out members to pass through; and a first partial area of the first inclined portion is attached to the V-shaped end, and a second partial area of the first inclined portion has a gap with the V-shaped end; and/or a first partial area of the second inclined portion is attached to the V-shaped end, and a second partial area of the second inclined portion has a gap with the V-shaped end.

12. The vehicle according to claim 11, wherein each of the two opposite ends of the electrode core body in the first direction further comprises a flat surface extended from each of both ends of the V-shaped end, and the V-shaped end and the flat surface form a step structure.

13. The vehicle according to claim 12, wherein the spacer further comprises a flat portion, and the flat portion is disposed on one of the flat surfaces.

14. The vehicle according to claim 13, wherein the first inclined portion and the second inclined portion are connected by the flat portion.

\* \* \* \* \*